(12) United States Patent
Chung et al.

(10) Patent No.: US 12,021,953 B2
(45) Date of Patent: Jun. 25, 2024

(54) PRIORITY SELECTION FOR MULTIPLE PROTOCOL STACKS

(71) Applicant: TEXAS INSTRUMENTS INCORPORATED, Dallas, TX (US)

(72) Inventors: Peter Wongeun Chung, Frisco, TX (US); Alexander D'Abreu, Dallas, TX (US); Arvind Kandhalu, Plano, TX (US); Max Wennerfeldt, Norrköping (SE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/328,384

(22) Filed: May 24, 2021

(65) Prior Publication Data

US 2022/0377158 A1  Nov. 24, 2022

(51) Int. Cl.
*H04L 69/18* (2022.01)
(52) U.S. Cl.
CPC .................................. *H04L 69/18* (2013.01)
(58) Field of Classification Search
None
See application file for complete search history.

(56) References Cited

U.S. PATENT DOCUMENTS

| | | | | |
|---|---|---|---|---|
| 5,506,969 | A * | 4/1996 | Wall | G06F 13/362 710/112 |
| 9,313,799 | B2 * | 4/2016 | Tzoreff | H04W 88/06 |
| 11,314,436 | B1 * | 4/2022 | Gahlot | G06F 3/061 |

| | | | | |
|---|---|---|---|---|
| 2003/0023728 | A1 * | 1/2003 | Yaung | H04L 67/1008 718/103 |
| 2004/0047594 | A1 * | 3/2004 | Towler | G06T 9/007 348/E5.005 |
| 2006/0230195 | A1 * | 10/2006 | Kootstra | H04L 47/2441 710/39 |

(Continued)

FOREIGN PATENT DOCUMENTS

| | | | | |
|---|---|---|---|---|
| CA | 2265692 C | * | 8/2001 | ......... H04L 12/5693 |
| CN | 107547388 A | * | 1/2018 | |

(Continued)

OTHER PUBLICATIONS

Texas Instruments, "Application States and Scheduling Policies", 2019, Accessed online on Aug. 7, 2023 from https://software-dl.ti.com/simplelink/esd/simplelink_cc13x2_26x2_sdk/3.40.00.02/exports/docs/dmm/dmm_user_guide/html/dmm/states-and-policies.html (Year: 2019).*

(Continued)

*Primary Examiner* — Dhairya A Patel
*Assistant Examiner* — Sandarva Khanal
(74) *Attorney, Agent, or Firm* — Mandy Barsilai Fernandez; Frank D. Cimino (57) ABSTRACT

A method includes assigning a priority to each of a plurality of protocol activities to produce stack priority information for each of a plurality of protocol stacks. The method further includes dynamically adjusting the priority of each of the plurality of protocol activities in the stack priority information based on a network maintenance activity and based on a rejection or an acceptance of the corresponding protocol activity by a dynamic multi-protocol manager (DMM). The method further includes providing the stack priority information to the DMM.

22 Claims, 5 Drawing Sheets

(56) References Cited

U.S. PATENT DOCUMENTS

| | | | |
|---|---|---|---|
| 2008/0287158 A1* | 11/2008 | Rayzman | H04W 72/563 455/552.1 |
| 2009/0164627 A1* | 6/2009 | Tateno | H04L 69/324 709/224 |
| 2009/0323532 A1* | 12/2009 | Lai | H04L 47/2433 370/235 |
| 2011/0280166 A1* | 11/2011 | Nien | H04W 76/19 370/310 |
| 2012/0327790 A1* | 12/2012 | Lee | H04W 72/1215 370/252 |
| 2015/0212851 A1* | 7/2015 | Busaba | G06F 9/38585 711/151 |
| 2015/0237128 A1* | 8/2015 | Castro | H04L 63/0876 726/4 |
| 2016/0316378 A1* | 10/2016 | Su | H04W 24/02 |
| 2017/0177518 A1* | 6/2017 | Chew | G06F 11/3466 |
| 2018/0032585 A1* | 2/2018 | Kadiyala | G06N 20/00 |
| 2018/0279209 A1* | 9/2018 | Fang | H04L 5/005 |
| 2019/0037053 A1* | 1/2019 | Murawski | G06F 9/5083 |
| 2019/0053259 A1* | 2/2019 | Kandhalu Raghu | H04L 47/6275 |
| 2019/0075190 A1* | 3/2019 | Huo | H04L 69/24 |

FOREIGN PATENT DOCUMENTS

| | | | |
|---|---|---|---|
| EP | 0695069 A2 * | 1/1996 | H04L 9/40 |
| WO | WO-0237754 A2 * | 5/2002 | H04L 47/10 |
| WO | WO-2012042426 A1 * | 4/2012 | H04L 1/1867 |
| WO | WO-2012125741 A1 * | 9/2012 | H04L 41/5022 |
| WO | WO-2014191797 A1 * | 12/2014 | H04W 36/14 |
| WO | WO-2015078531 A1 * | 6/2015 | H04B 10/27 |

OTHER PUBLICATIONS

Yao et al., "Reducing Stack with Intra-Task Threshold Priorities in Real-Time Systems", Proc. of the 10th Int. Conf. on Embedded Software (EMSOFT 2010), Scottsdale, Arizona (USA), Oct. 24-29, 2010. (Year: 2010).*

Dag et al., "Dynamic Multi Threshold Priority Packet Scheduling Algorithms", MATEC Web of Conferences 7, 06004 (2016); ICMIE 2016; DOI: 10.1051/matecconf/20167506004 (Year: 2016).*

CN 107547388 A (Machine Generated English Translation; Source—FIT database) (Year: 2018).*

Texas Instruments, "SimpleLink CC13x2_26x2 SDK 3.30.00.03 Release Notes," Copyright 1995-2019, 5 p.

Texas Instruments, "SimpleLink MCU SDK User's Guide," Copyright 1995-2019, 52 p.

* cited by examiner

PRIORITY SELECTION FOR MULTIPLE PROTOCOL STACKS

CROSS-REFERENCE TO RELATED APPLICATIONS

The present application relates to U.S. Provisional Patent Application No. 62/912,982, which was filed Oct. 9, 2019, is titled "Enabling Dynamic Priority For Dynamic Multi-Protocol Manager (DMM) Applications Based On Protocol Stack Activity And Global Priority Table," and is hereby incorporated herein by reference in its entirety.

SUMMARY

In accordance with at least one example of the disclosure, a method includes assigning a priority to each of a plurality of protocol activities to produce stack priority information for each of a plurality of protocol stacks. The method further includes dynamically adjusting the priority of each of the plurality of protocol activities in the stack priority information based on a network maintenance activity and based on a rejection or an acceptance of the corresponding protocol activity by a dynamic multi-protocol manager (DMM). The method further includes providing the stack priority information to the DMM.

In accordance with at least one example of the disclosure, a system includes a plurality of protocol stacks configured to assign a priority to each of a plurality of protocol activities to produce stack priority information for each of the plurality of protocol stacks. The plurality of protocol stacks is further configured to store the stack priority information in a radio command data structure, wherein the radio command data structure includes a plurality of radio commands corresponding to the plurality of protocol activities. The plurality of protocol stacks is further configured to store stack identification information in the radio command data structure and dynamically adjust the priority in the radio command data structure of each of the plurality of protocol activities based on a network maintenance activity and based on a rejection or an acceptance of the corresponding protocol activity. The system further includes a DMM configured to determine a final priority for each of the plurality of protocol activities based on the stack priority information in the radio command data structure, application priority weighting, and a priority from a global priority table. The DMM is further configured to identify a stack activity among the plurality of protocol activities based on the final priorities and identify a radio command corresponding to the stack activity based on the stack priority information and the stack identification information. The DMM is further configured to dynamically assign an RF bandwidth to the radio command and send, to a transmitter, RF information of the RF bandwidth.

BRIEF DESCRIPTION OF THE DRAWINGS

For a detailed description of various examples, reference will now be made to the accompanying drawings in which.

DETAILED DESCRIPTION

Current management of multiple protocols in a system generally entails the use of one of two processes. The first process is single priority protocol selection, which defines all radio commands from a protocol stack to have the same priority. Thus, when two stacks are running simultaneously, the protocol priority of one stack is consistently higher than that of the other stack, regardless of protocol activities. The second process is static priority protocol selection, which defines priorities of the radio commands as fixed and not changed during run time. Unlike single priority protocol selection, static priority protocol selection does not select a radio command based on priorities of the protocol stacks. Rather, static priority protocol selection may use other attributes to determine the priority of a radio command. For example, static priority protocol selection may select a radio command based on the time the radio command is received.

Neither of these two current protocol management processes can dynamically adapt to aspects of a system—especially when the system has a single radio. When running multiple protocol stacks on a single radio, the protocols are not always able to access the radio bandwidth because the radio bandwidth can be assigned to only one protocol stack at a time. The current protocol management processes may fail because the current protocol management processes limit the protocol communication to reduced-function device (RFD) nodes, lack the ability to a support network coordinator node, and degrade network performance. In some cases, the system can fail during network operations.

This disclosure describes an adaptive method for protocol selection and a DMM to dynamically adapt to concurrent protocol activities. The adaptive method for protocol selection determines stack priority information of the protocol activities for each protocol stack. For example, the DMM determines the stack priority information for a low-rate wireless personal area network (WPAN), or another network running multiple protocols on a single radio. The stack priority information indicates to the DMM priority levels of the protocol activities within a particular protocol stack; for example, a normal priority, a high priority, or an urgent priority. The protocol stacks can adapt the stack priority information of the protocol activities based on whether each protocol stack dynamically adjusts the priority of the protocol activities based on a current network status and a history of an RF command schedule result. At a system level, the DMM identifies final priorities for protocol activities across multiple protocol stacks. The final priorities are priority values corresponding to the protocol activities from each of the protocol stacks. To determine which of the protocol activities will occupy the radio, the DMM checks a global priority table to determine which of the protocol activities have a higher priority. The DMM determines which of the radio commands should occupy the radio based on the final priorities. The final priorities are based on the stack priority information of the protocol activities, application priority weighting values, and priorities from the global priority table. When the system has a single radio and multiple protocols concurrently send radio commands to occupy the single radio, the DMM identifies a critical stack activity among the protocol activities based on the final priorities and rejects the other protocol activities when there is a conflict between the protocol activities. The critical stack activity that is scheduled is the protocol activity with the highest priority.

Figure 1:
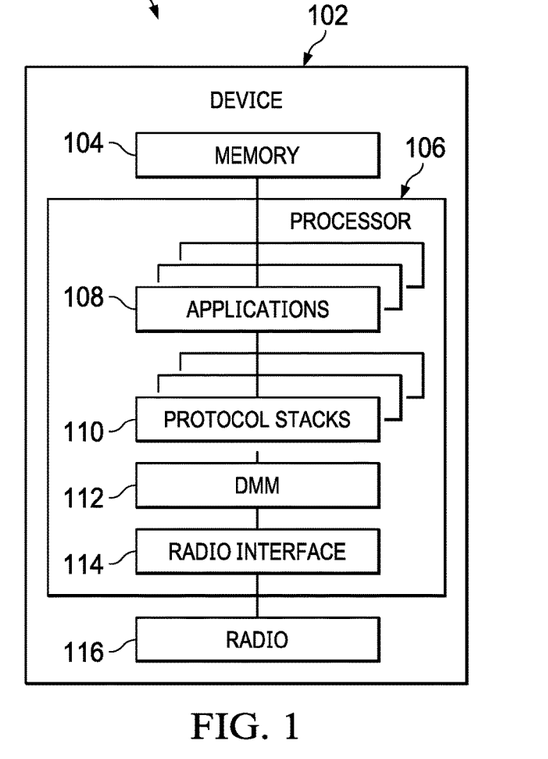
FIG. 1 is a block diagram of a system in accordance with various examples.

FIG. 1 depicts an example block diagram of a system 100. As shown, the system 100 includes a device 102 that includes a memory 104 and a processor 106. The processor 106 includes a plurality of applications 108, a plurality of protocol stacks 110, a DMM 112, a radio interface 114, and a radio 116. The device 102 may be a wireless communication device that can connect to a network based on BLUETOOTH® low energy (BLE) protocol, Institute of Electrical and Electronics Engineers (IEEE) 802.15.4, ZIG-BEE® protocol, EASYLINK® protocol, and THREAD® protocol using wireless communication techniques over the radio 116. For example, the device 102 may be a wireless communication device that communicates with a wireless router using various wireless protocol stacks, transmitted and received over the radio 116.

As described above, the device 102 includes the memory 104 and the processor 106. The memory 104 includes instructions that, when executed by the processor 106, cause the processor 106 to perform the actions attributed herein to the processor 106, including interfacing with the plurality of applications 108. The plurality of applications 108 communicates with the plurality of protocol stacks 110. The plurality of protocol stacks 110 performs various protocol activities for the device 102. For example, a protocol activity may include continuously receiving a particular frequency over the radio 116. The plurality of protocol stacks 110 interfaces with the DMM 112.

The DMM 112 monitors the protocol activities of the plurality of protocol stacks 110 and compares stack priority information associated with the protocol activities. For example, a first protocol stack of the plurality of protocol stacks 110 may continuously receive data at a particular frequency using the radio 116 at the same time that a second protocol stack of the plurality of protocol stacks 110 requests to transmit data using the radio 116. The protocol activities of the first protocol stack and the second protocol stack create a conflict. A conflict occurs between protocol activities of the plurality of protocol stacks 110 when protocol stacks request to occupy the radio 116 concurrently. When the conflict occurs, the DMM 112 decides which of the plurality of protocol stacks 110 may occupy the radio 116 at a given time.

The DMM 112 determines which of the plurality of protocol stacks 110 may occupy the radio 116 based on final priorities for the protocol activities. The final priorities are based on the stack priority information of the protocol activities, priorities from a global priority table (not shown in FIG. 1), and application priority weighting values (not shown in FIG. 1). The application priority weighting values are used by the DMM 112 to determine the final priorities of the protocol activities. The network activities are mainly controlled by the protocol stacks 110, but the importance of a network activity can be changed depending on the current application state. For example, if the data transfer of a first protocol stack of the protocol stacks 110 is critical during a certain time window, then the application should be able to add a weighting to the corresponding network activity during that time window. Such a weighting causes an increase of the priority of the data transfer command of the first protocol stack over a second protocol stack of the protocol stacks. In an example, the application priority weighting values may be defined by a user input or may be a default value. As described in detail below, after determining the final priorities, the DMM 112 determines which of the protocol activities is a critical stack activity based on the final priorities and instructs the radio interface 114 to control the radio 116 to perform the critical stack activity. For example, if the critical stack activity requests to receive a particular frequency, the radio interface 114 will control the radio 116 to tune into the particular frequency and communicate the information being received to the chosen protocol stack.

Figure 2:
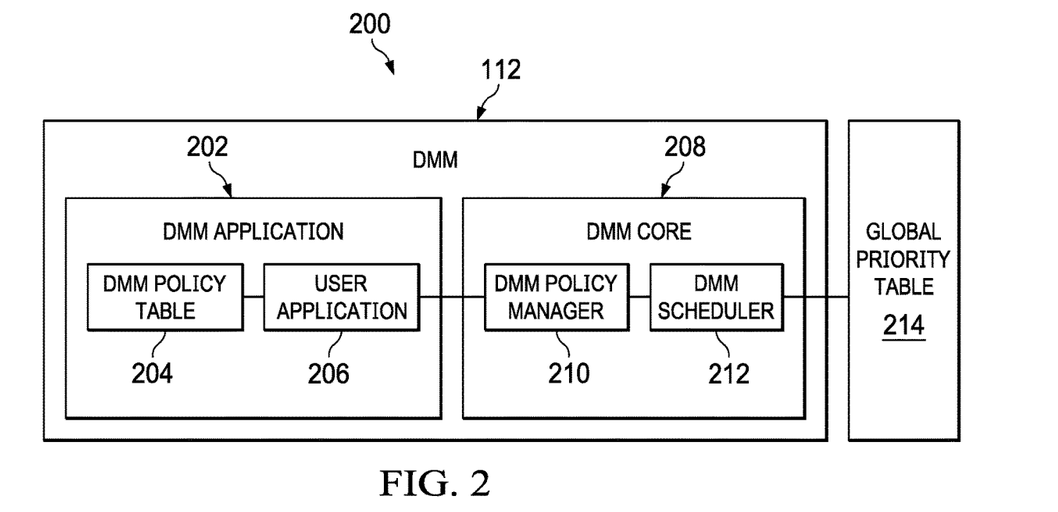
FIG. 2 is a block diagram of a system in accordance with various examples.

FIG. 2 is a block diagram of a portion 200 of the system 100 (FIG. 1), in accordance with various examples. As shown, the portion 200 includes the DMM 112, a DMM application 202, a DMM policy table 204, a user application 206, a DMM core 208, a DMM policy manager 210, a DMM scheduler 212, and a global priority table 214. The DMM 112 includes the DMM application 202 and the DMM core 208. The DMM application 202 includes the DMM policy table 204 and the user application 206. The DMM core 208 includes the DMM policy manager 210 and the DMM scheduler 212. The global priority table 214 is stored in any suitable memory and is accessible to the DMM 112, as shown.

A user provides user definitions to the DMM application 202. The user definitions are used to define stack priority information for protocol activities of the plurality of protocol stacks 110. The user definitions indicate to the DMM application 202 at which priority level each of the activities of the plurality of protocol stacks 110 is defined. For example, the priority levels may be a first priority, a second priority that is higher than the first priority, or a third priority that is higher than the second priority. In an example, the user definitions depend on a particular use of the device 102. For example, for the device 102 to perform a protocol activity of receiving a particular frequency over the radio, the device 102 may use one of the plurality of protocol stacks 110 to control the radio 116, where the user definition may define the protocol activity as having the first priority.

The DMM policy table 204 is configured to store the stack priority information based on the user definitions and interface with the user application 206. In an example, the stack priority information may include application states and a priority weighting value per application state. The user application 206 communicates with the plurality of protocol stacks 110 and the DMM policy manager 210. The user application 206 is configured to provide the DMM policy manager 210 with the stack priority information of the protocol activities of the plurality of protocol stacks 110. Providing the DMM policy manager 210 with the stack priority information enables the DMM policy manager 210 to track which protocol activity is the critical stack activity. The DMM policy manager 210 is configured to store the stack priority information corresponding to the plurality of protocol stacks 110 and communicate with the DMM scheduler 212. In an example, the DMM 112 may use the stack priority information from the DMM policy manager 210 to compare the protocol activities and determine which of the protocols activities is the critical stack activity. In an example, the critical stack activity may be one of the protocol activities with a highest priority based on the final priorities.

The DMM scheduler 212 is configured to determine the final priorities of the protocol activities based on the stack priority information of the protocol activities, priorities from the global priority table 214, and application priority weighting values. For example, a particular protocol activity of a protocol stack from the plurality of protocol stacks 110 may have the first priority, the second priority, or the third priority. In an example, the priorities from the global priority table 214 may be based on a user definition that assigns a relationship between the protocol activities. The DMM core 208 obtains the application priority weighting values based on another user definition corresponding to a subjective priority the user assigns to the protocol activities. The DMM scheduler 212 determines the final priorities based on the following equation:

Final Priority=GlobalPriorityTable(Stack Activity, Priority)+Application Weighting, where GlobalPriorityTable( ) is used to search the global priority table 214 through indices of the protocol activities and the corresponding priorities. The Application Weighting is added to the output of the GlobalPriorityTable( ) and is one of the application priority weighting values. The mapping of priorities in the global priority table 214 is described further with reference to FIG. 3.

Figure 3:
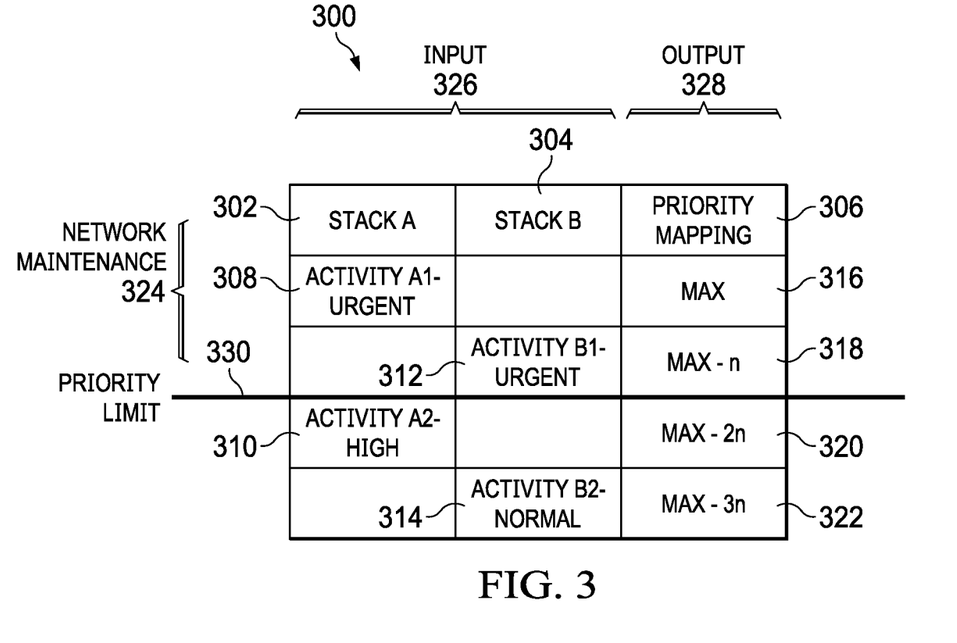
FIG. 3 is a global priority table in accordance with various examples.

FIG. 3 depicts an example of a global priority table 300, which is representative of the global priority table 214 (FIG. 2). As shown, the global priority table 300 includes a first column for stack A 302, a second column for stack B 304, and a third column for priority mapping 306. The first column for stack A 302 and the second column for stack B 304 may correspond to different protocols of the plurality of protocol stacks 110. The first column for stack A 302 may include an Activity A1 308 with an urgent priority and an Activity A2 310 with a high priority. The second column for stack B 304 may include an Activity B1 312 with an urgent priority and an Activity B2 314 with a normal priority. The third column for priority mapping 306 may include a Max value 316, a Max-n value 318, a Max-2n value 320, and a Max-3n value 322. The global priority table 300 includes an area designated for network maintenance 324, an input 326, an output 328, and a priority limit 330. The global priority table 300 is stored in any suitable memory and is accessible to the DMM 112.

The global priority table 300 is organized in three columns; the stack A 302, the stack B 304, and the priority mapping 306. The input 326 includes information from the plurality of protocol stacks 110 about the stack A 302 and the stack B 304. The global priority table 300 is shown in FIG. 3 with three columns, but can be extended based on the protocol stacks and applications. In an example, the global priority table 300 receives the input 326 from the DMM scheduler 212 and identifies priority values corresponding to the stack A 302 and the stack B 304 based on the priority mapping 306. In an example, before the global priority table 300 receives the input 326, the priority mapping 306 is indexed based on a user input or default values. The global priority table 300 sends the output 328 to the DMM scheduler 212. The output 328, based on the input 326 and the priority mapping 306, includes the priority values of either the stack A 302 or the stack B 304.

The priority mapping 306 is indexed so the protocol activities for the stack A 302 and the stack B 304 correspond with a particular priority in the priority mapping 306. For example, when the input 326 includes information about the stack A 302 indicating the Activity A1 308 is to occur urgently, the global priority table 300 determines the particular priority of the Activity A1 308 based on an index of the Activity A1 308 in the priority mapping 306. Here, the particular priority corresponding to the Activity A1 308 is the Max value 316, which indicates the Activity A1 308 has the highest priority. The global priority table 300 then sends the particular priority of the Max value 316 to the DMM scheduler 212 as the output 328.

In another example, the particular priority may include a second highest priority of the Max-n value 318. The global priority table 300 then sends the particular priority with the second highest priority of the Max-n value 318 to the DMM scheduler 212 as the output 328. The Max-n value 318 is n less than the Max value 316. In an example, n may be based on an input from a user or may be a default value. The priority values of the priority mapping 306 are indexed in a hierarchy decrementing from the Max value 316 by n. For example, the highest priority is the Max value 316, the second highest priority is the Max-n value 318, the third highest priority is the Max-2n value 320, and the fourth highest priority is the Max-3n value 322. The priority mapping 306 allows the global priority table 300 to index the priority values of the activities from the stack A 302 and the stack B 304.

In an example, the Activity A1 308 corresponds with the Max value 316. Because Activity A1 308 corresponds with the Max value 316, the DMM 112 will determine the Activity A1 308 is the critical stack activity and will instruct the radio interface 114 to control the radio and perform the Activity A1 308. In another example, when the device 102 requests the Activity A1 308 at a same time as the Activity B1 312, a conflict will occur between the Activity A1 308 and the Activity B1 312. When the conflict occurs, the global priority table 300 searches the table for a priority in the third column for priority mapping 306 to resolve which activity is the critical stack activity. In this case, even though the Activity B1 312 has an urgent priority, the global priority table 300 indicates the Activity A1 308 has a higher priority according to the third column for priority mapping 306. The third column for priority mapping 306 provides the DMM 112 priority values associated with the Activity A1 308 and the Activity B1 312, which provide the DMM 112 information to determine which activity is the critical stack activity.

In an example, the global priority table 300 is configured to limit the amount of a priority of a corresponding protocol stack activity. For example, the Activity A2 310 has a high priority and the Activity B2 314 has a normal priority. For example, when the protocol stack B 304 attempts to increase the priority of the Activity B2 314, the global priority table checks if the priority goes beyond the priority limit 330. If the priority goes beyond the priority limit 330, the global priority table 300 applies the application weighing only up to the limit. In this case, the priority of the Activity B2 314 is limited to the Max-2n value 320 based on the priority limit 330. One objective for limiting a priority of a protocol activity is to separate protocol activities for network maintenance and protocol activities for protocol operation. For example, if a protocol stack attempts to increase a corresponding protocol activity above the Max-2n value 320, the global priority table 300 will limit the priority value of the protocol activity based on the priority limit 330. The protocol activities in the area for network maintenance 324 are of relatively higher priority so as to maintain network connectivity between the device 102 and another device. For example, to maintain network connectivity the protocol activities of the device 102 may include a network connection establishment to another device, a transmit beacon to synchronize transmission to the other device, and a receive beacon to synchronize receiving a signal from the other device. If the priority limit 330 were removed, then the protocol activities for protocol operation could interfere with network connectivity between the device 102 and another device.

The increments of the third column for priority mapping 306 may be based on a user definition. For example, the user may define the Max value 316 as a value of 200 and the Max-n value 318 as 175 (where a value of n is 25). In an example, the Max value 316, the Max-n value 318, and priority levels of protocol activities are set by default values. In another example, the priority levels of the protocol activities are not limited to normal, high, and urgent, but may be various priority levels which may be different from the three example priority levels shown in FIG. 3.

Figure 4:
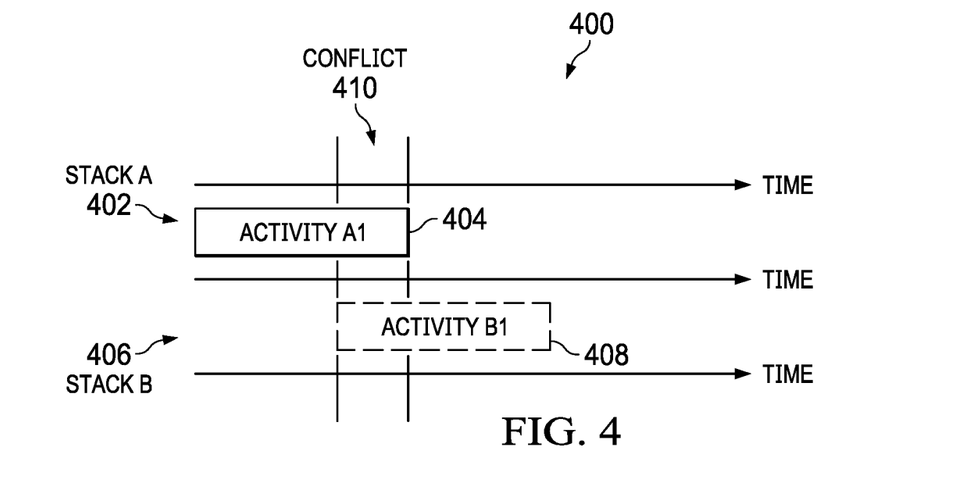
FIG. 4 is a timing diagram in accordance with various examples.

FIG. 4 depicts a timing diagram 400 in accordance with various examples. As shown, the timing diagram 400 includes a protocol stack A 402, a protocol Activity A1 404, a protocol stack B 406, a protocol Activity B1 408, and a conflict 410. The protocol stack A 402 corresponds with the Activity A1 404 and the protocol stack B 406 corresponds with the Activity B1 408. FIG. 4 depicts the Activity A1 404 of the protocol stack A 402 and the Activity B1 408 of the protocol stack B 406 with respect to time. The Activity A1 404 and the Activity B1 408 may occur at the same or different times.

In an example, the timing diagram 400 is implemented using the DMM 112. The plurality of protocol stacks 110 may send the DMM 112 time information corresponding to a particular stack activity. For example, the protocol stack A 402 corresponds to one of the plurality of protocol stacks 110 and the protocol stack B 406 corresponds to another of the plurality of protocol stacks 110. The plurality of protocol stacks 110 sends information of the protocol stack A 402 to the DMM 112 to initiate the Activity A1 404. The plurality of protocol stacks 110 also sends information of the protocol stack B 406 to the DMM 112 to initiate the Activity B1 408. The timing diagram 400 represents a process the DMM 112 follows to identify and resolve the conflict 410 and determines the radio command to send to the radio interface 114 between the Activity A1 404 and the Activity B1 408.

The protocol stack A 402 initiates the Activity A1 404 at a first starting time. For example, the Activity A1 404 may provide the DMM 112 with a radio command to receive a particular frequency over a particular time duration. The protocol stack B 406 initiates the Activity B1 408 at a second starting time. For example, the Activity B1 408 may signal to the device 102 to transmit another frequency over another time duration. In an example, the time duration for the Activity A1 404 and the time duration of the Activity B1 408 overlap. The overlap of the time durations creates the conflict 410. When the conflict 410 occurs, the DMM 112 determines which of the Activity A1 404 and the Activity B1 408 has a higher priority. For example, the DMM 112 may use the global priority table 300 in FIG. 3 to determine the priority levels of the Activity A1 404 and the Activity B1 408 to determine the critical stack activity. The DMM 112 is configured to reject the protocol activity with a lower priority. In an example, the DMM 112 determines the critical stack activity to be the Activity A1 404 and the rejected protocol activity is the Activity B1 408, as indicated by the dashed line.

Figure 5:
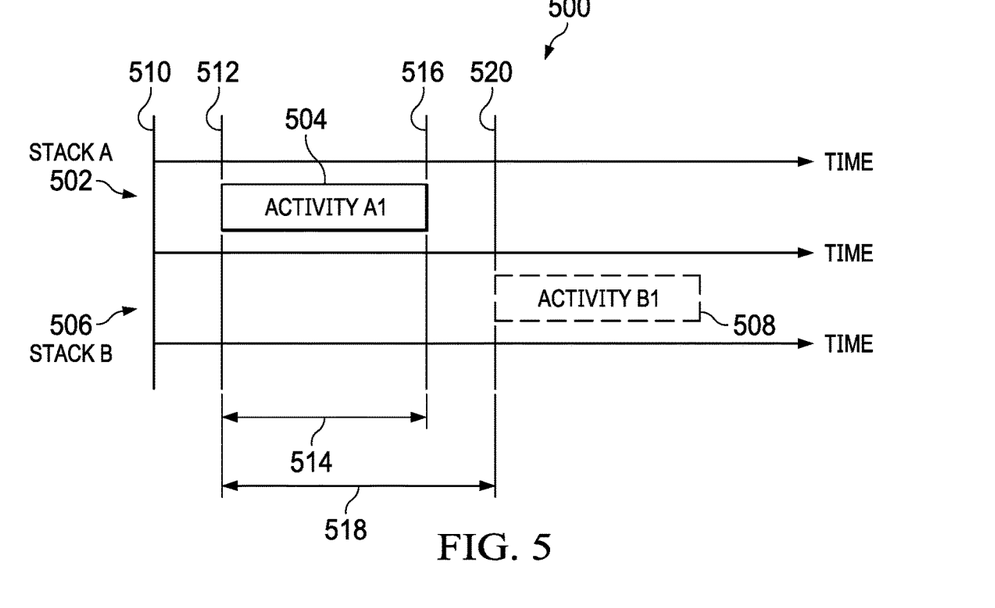
FIG. 5 is a timing diagram in accordance with various examples.

FIG. 5 depicts a timing diagram 500 according to various examples. As shown, the timing diagram 500 includes a protocol stack A 502, a protocol Activity A1 504, a protocol stack B 506, a protocol Activity B1 508, a current time 510, a start time 512, a duration 514, an end time 516, an allowable delay 518, and a max start time 520. The protocol stack A 502 corresponds with the Activity A1 504 and the protocol stack B 506 corresponds with the Activity B1 508. FIG. 5 depicts the Activity A1 504 of the protocol stack A 502 and the Activity B1 508 of the protocol stack B 506 with respect to time. The Activity A1 504 and the Activity B1 508 may occur at the same or different times.

In an example, the timing diagram 500 is implemented using the DMM 112. The DMM 112 identifies the current time 510. The plurality of protocol stacks 110 may send the DMM scheduler 212 time information corresponding to a particular stack activity. For example, the protocol stack A 502 corresponds to one of the plurality of protocol stacks 110 and the protocol stack B 506 corresponds to another of the plurality of protocol stacks 110. The plurality of protocol stacks 110 sends information from the protocol stack A 502 to the DMM scheduler 212 to initiate the Activity A1 504. The information to initiate the Activity A1 504 may provide the DMM scheduler 212 the start time 512, the duration 514, the end time 516, and the allowable delay 518. In an example, the plurality of protocol stacks 110 sends information from the protocol stack B 506 to the DMM scheduler 212 to initiate the Activity B1 508. The information to initiate the Activity B1 508 may also provide the DMM scheduler 212 the start time 512, the duration 514, the end time 516, and the allowable delay 518. The timing diagram 500 represents a process the DMM 112 implements to determine the radio command to send to the radio interface 114 between the Activity A1 504 and the Activity B1 508.

Because both the information to initiate the Activity A1 504 and the information to initiate the Activity B1 508 provide the DMM scheduler 212 with a same value for the start time 512, the DMM scheduler 212 delays sending to the radio interface 114 one of the Activity A1 504 or the Activity B1 508 by a duration indicated by the allowable delay 518. For example, the Activity A1 504 may provide the DMM scheduler 212 a radio command to receive a particular frequency over a particular time duration beginning at the start time 512 and the Activity B1 508 may provide the DMM scheduler 212 another radio command to transmit another frequency over the particular time duration also beginning at the start time 512. In response to both the Activity A1 504 and the Activity B1 508 beginning at the start time 512, the DMM scheduler 212 may delay sending the Activity B1 508 to the radio interface 114.

In an example, the information to initiate the Activity A1 504 and the information to initiate the Activity B1 508 may include priorities such that the DMM scheduler 212 may determine which of the Activity A1 504 or the Activity B1 508 has a lower priority. The lower priority indicates to the DMM scheduler 212 which radio command from the Activity A1 504 or the Activity B1 508 to delay sending to the radio interface 114. In an example, if the Activity B1 508 has a lower priority, the DMM scheduler 212 sends the radio command corresponding to the Activity B1 508 at the max start time 520 based on the allowable delay 518. In an example, the DMM scheduler 212 determines the critical stack activity to be the Activity A1 504 and the delayed protocol activity is the Activity B1 508, as indicated by the dashed line.

Figure 6:
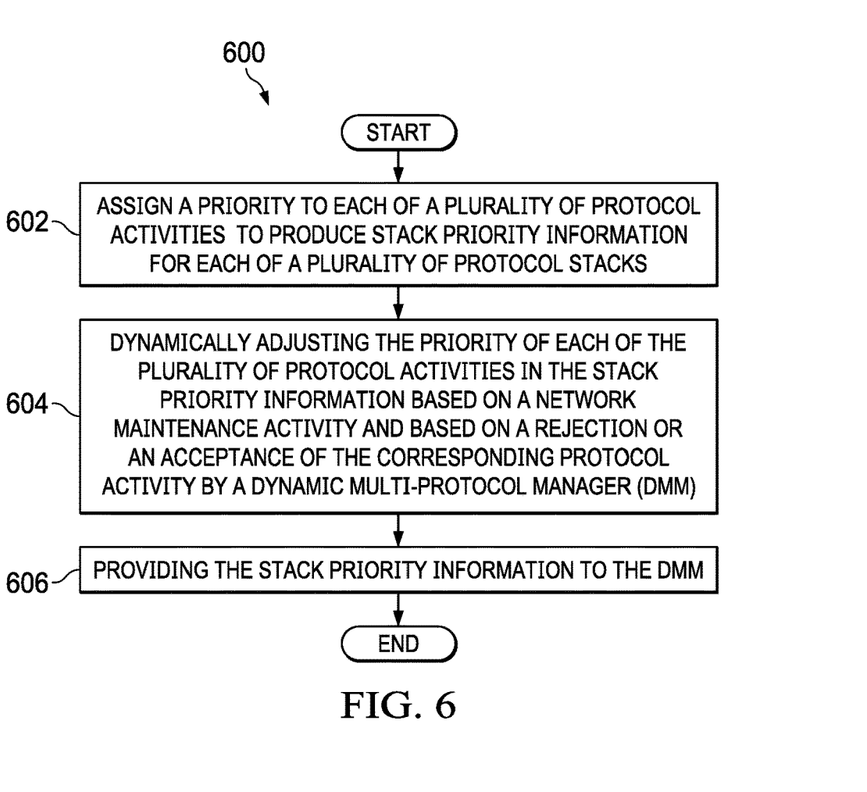
FIG. 6 is a flow diagram of a method in accordance with various examples.

FIG. 6 is a flow diagram of a method 600 for priority selection for multiple protocol stacks, e.g., in the system 100. The method 600 is used by stacks of a system to provide stack priority information to the DMM. The method 600 includes the processor assigning a priority to each of a plurality of protocol activities to produce stack priority information for each of a plurality of protocol stacks (602). The method 600 includes the processor dynamically adjusting the priority of each of the plurality of protocol activities in the stack priority information based on a network maintenance activity and based on a rejection or an acceptance of the corresponding protocol activity by a DMM (604). The method 600 includes the processor providing the stack priority information to the DMM (606).

Figure 7:
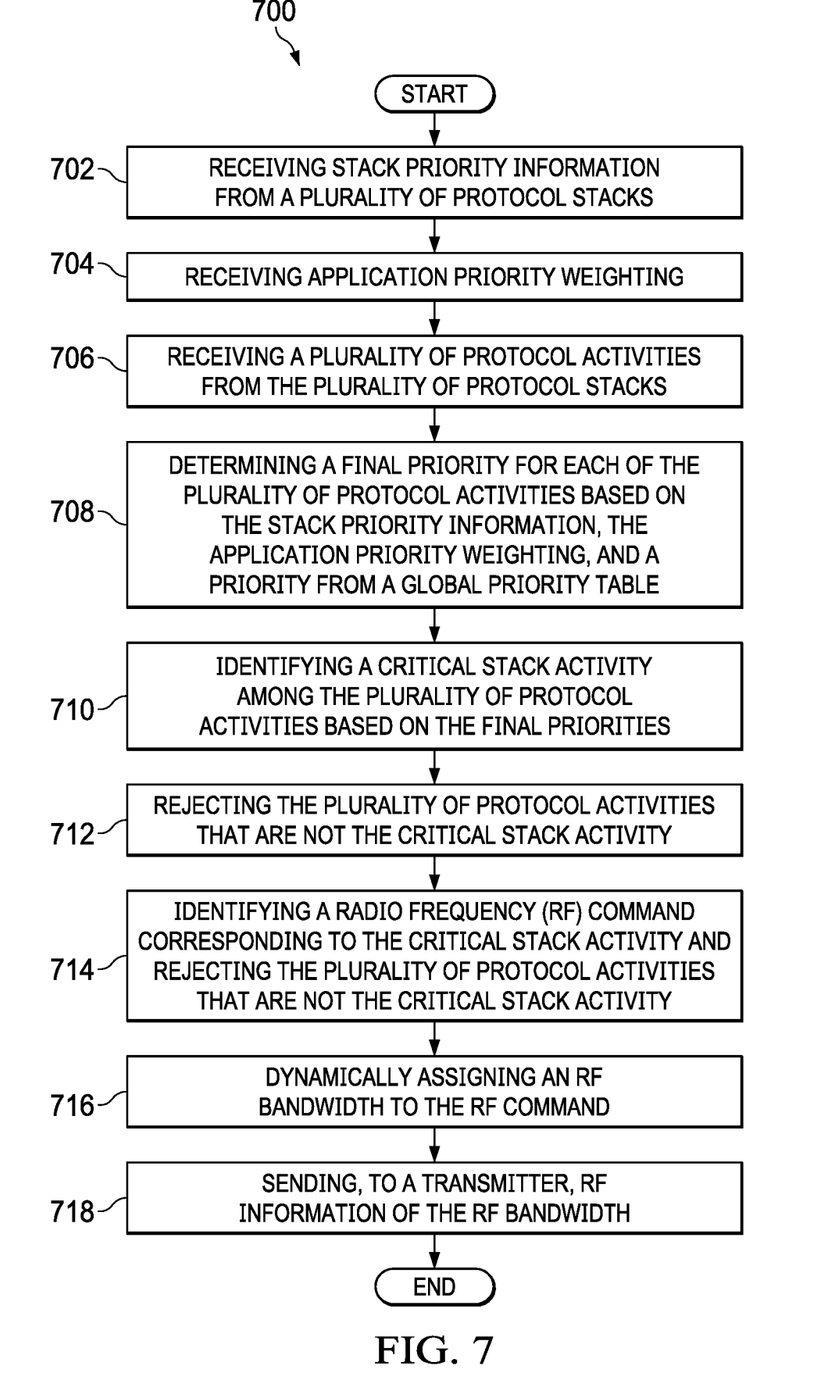
FIG. 7 is a flow diagram of a method in accordance with various examples.

FIG. 7 is a flow diagram of a method 700 for priority selection for multiple protocol stacks, e.g., in the system 100. The method 700 is used by the DMM of a system to send RF information to a transmitter. The method 700 includes the processor receiving stack priority information from a plurality of protocol stacks (702). The method 700 includes the processor receiving application priority weighting (704). The method 700 includes the processor receiving a plurality of protocol activities from the plurality of protocol stacks (706). The method 700 includes the processor determining a final priority for each of the plurality of protocol activities based on the stack priority information, the application priority weighting, and a priority from a global priority table (708).

The method 700 includes the processor identifying a critical stack activity among the plurality of protocol activities based on the final priorities (710). The method 700 includes the processor rejecting the plurality of protocol activities that are not the critical stack activity (712). The method 700 includes the processor identifying a RF command corresponding to the critical stack activity and rejecting the plurality of protocol activities that are not the critical stack activity (714). The method 700 includes the processor dynamically assigning an RF bandwidth to the RF command (716). The method 700 includes the processor sending, to a transmitter, RF information of the RF bandwidth (718).

Figure 8:
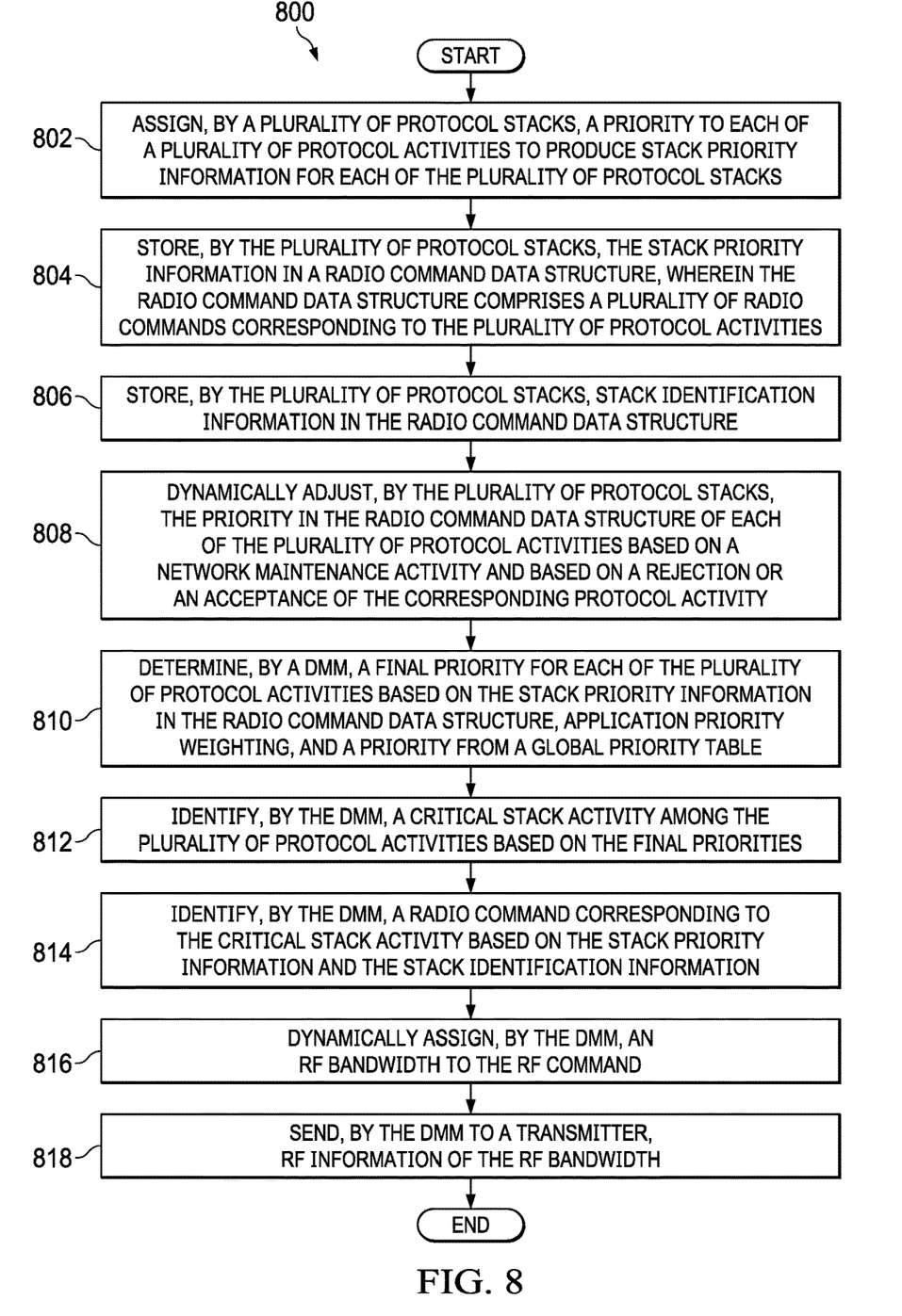
FIG. 8 is a flow diagram of steps corresponding to a system in accordance with various examples.

FIG. 8 is a flow diagram of a system 800 for priority selection of multiple protocol stacks by the plurality of protocol stacks 110 and the DMM 112 of the processor 106. The system 800 is configured to assign, by the plurality of protocol stacks 110 of the processor 106, a priority to each of a plurality of protocol activities to produce stack priority information for each of the plurality of protocol stacks 110 (802). The system 800 is configured to store, by the plurality of protocol stacks 110 of the processor 106, the stack priority information in a radio command data structure, where the radio command data structure includes a plurality of radio commands corresponding to the plurality of protocol activities (804). The system 800 is configured to store, by the plurality of protocol stacks 110 of the processor 106, stack identification information in the radio command data structure (806). The system 800 is configured to dynamically adjust, by the plurality of protocol stacks 110 of the processor 106, the priority in the radio command data structure of each of the plurality of protocol activities based on a network maintenance activity and based on a rejection or an acceptance of the corresponding protocol activity (808).

The system 800 is configured to determine, by the DMM 112 of the processor 106, a final priority for each of the plurality of protocol activities based on the stack priority information in the radio command data structure, application priority weighting, and a priority from a global priority table (810). The system 800 is configured to identify, by the DMM 112 of the processor 106, a critical stack activity among the plurality of protocol activities based on the final priorities (812). The system 800 is configured to identify, by the DMM 112 of the processor 106, a radio command corresponding to the critical stack activity based on the stack priority information and the stack identification information (814). The system 800 is configured to dynamically assign, by the DMM 112 of the processor 106, an RF bandwidth to the RF command (816). The system 800 is configured to send, by the DMM 112 of the processor 106 to a transmitter, RF information of the RF bandwidth (818).

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

What is claimed is:

1. A method comprising:
    assigning a priority to each of a plurality of protocol activities to produce stack priority data for each of a plurality of protocol stacks;
    dynamically adjusting the priority of each of the plurality of protocol activities in the stack priority data based on a network maintenance activity and based on a rejection or an acceptance of a corresponding protocol activity of the plurality of protocol activities by a dynamic multi-protocol manager (DMM), wherein the priority of each of the plurality of protocol activities is adjusted to be lower than a priority of the network maintenance activity, and wherein the network maintenance activity comprises a connection establishment, a transmit beacon, and a receive beacon;
    increasing a priority level of the stack priority data based on an application priority weighting up to a limit in a global priority table, wherein the limit separates protocol activities for network maintenance and protocol activities for protocol operation;
    providing the stack priority data to the DMM;
    dynamically assigning, via the DMM, a radio frequency (RF) bandwidth based on the stack priority data; and
    sending, via the DMM to a transmitter, RF data based on the dynamic assignment.

2. The method of claim 1, wherein the stack priority data indicates one of the plurality of protocol activities is a first priority, a second priority higher than the first priority, or a third priority higher than the second priority.

3. The method of claim 1, wherein the application priority weighting is from a user definition.

4. The method of claim 1, further comprising providing a radio command to the DMM, wherein the radio command corresponds to the stack priority data and the RF bandwidth is assigned to the radio command.

5. The method of claim 1, further comprising sending protocol timing data of the plurality of protocol activities to the DMM.

6. A method comprising:
    receiving stack priority data from a plurality of protocol stacks;
    receiving application priority weighting;
    increasing a priority level of the stack priority data based on the application priority weighting up to a limit in a global priority table, wherein the limit separates protocol activities for network maintenance and protocol activities for protocol operation;

receiving a plurality of protocol activities from the plurality of protocol stacks;

determining a final priority for each of the plurality of protocol activities based on the stack priority data, the application priority weighting, and a priority from the global priority table, the priority from the global priority table based on a network maintenance activity, wherein determining the final priority for each of the plurality of protocol activities causes the final priority for each of the plurality of protocol activities to be lower than a priority of the network maintenance activity, and wherein the network maintenance activity comprises a connection establishment, a transmit beacon, and a receive beacon;

identifying a stack activity among the plurality of protocol activities based on the final priorities;

identifying a radio command corresponding to the stack activity and rejecting the plurality of protocol activities that are not the stack activity;

dynamically assigning a radio frequency (RF) bandwidth to the radio command; and sending, to a transmitter, RF data associated with the radio command.

7. The method of claim 6, wherein the stack priority data indicates one of the plurality of protocol activities is a first priority, a second priority higher than the first priority, or a third priority higher than the second priority.

8. The method of claim 6, wherein the application priority weighting is based on a first user definition, and wherein the global priority table is based on a second user definition.

9. The method of claim 6, further comprising providing the plurality of protocol stacks an acceptance or a rejection in response to identifying the radio command and rejecting the plurality of protocol activities.

10. The method of claim 6, further comprising:
searching an index of the global priority table using the stack priority data to obtain a value; and
adding the application priority weighting to the value to obtain the final priority.

11. The method of claim 6, further comprising determining the final priority for each of the plurality of protocol activities based on the stack priority data, the application priority weighting, the priority from the global priority table, and protocol timing data.

12. The method of claim 11, wherein the protocol timing data includes an allowable delay.

13. The method of claim 6, further comprising:
determining that a scheduling conflict exists between a first activity of the plurality of protocol activities and a second activity of the plurality of protocol activities, the first activity associated with a first protocol stack of the plurality of protocol stacks, and the second activity associated with a second protocol stack of the plurality of protocol stacks, wherein the first activity has the same application priority as the second activity; and
identifying a highest final priority activity between the first and second activities based on which of the first and second activities has a highest final priority, wherein identifying the stack activity comprises, responsive to determining that the scheduling conflict exists, identifying as the stack activity the highest final priority activity.

14. The method of claim 6, further comprising, receiving a first request to schedule a first activity of the plurality of protocol activities, the first request including data indicative of an end time, and a delay time, wherein sending the RF data associated with the radio command comprises sending the RF data associated with the radio command the delay time after the end time.

15. The method of claim 6, further comprising, responsive to determining that a data transfer command of a first protocol stack of the plurality of protocol stacks has a first priority during a first time window, adding a weighting to a corresponding activity of the plurality of protocol activities during the first time window to increase the final priority of the data transfer command of the first protocol stack over a second protocol stack of the plurality of protocol stacks.

16. A system comprising:
a processor;
a plurality of protocol stacks configured to be executed on the processor to:
assign a priority to each of a plurality of protocol activities to produce stack priority data for each of the plurality of protocol stacks;
store the stack priority data in a radio command data structure, wherein the radio command data structure comprises a plurality of radio commands corresponding to the plurality of protocol activities;
store stack identification data in the radio command data structure; and
dynamically adjust the priority in the radio command data structure of each of the plurality of protocol activities based on a network maintenance activity and based on a rejection or an acceptance of a corresponding protocol activity, wherein the network maintenance activity comprises a connection establishment, a transmit beacon, and a receive beacon; and
a dynamic multi-protocol manager (DMM) configured to be executed on the processor to:
determine a final priority for each of the plurality of protocol activities based on the stack priority data in the radio command data structure, application priority weighting, and a priority from a global priority table, wherein a priority level of the stack priority data is increased based on the application priority weighting up to a limit in the global priority table, wherein the limit separates protocol activities for network maintenance and protocol activities for protocol operation, and wherein determining the final priority for each of the plurality of protocol activities causes the final priority for each of the plurality of protocol activities to be lower than a priority of the network maintenance activity;
identify a stack activity among the plurality of protocol activities based on the final priorities;
identify a radio command corresponding to the stack activity based on the stack priority data and the stack identification data;
dynamically assign a radio frequency (RF) bandwidth to the radio command; and
send, to a transmitter, RF data of the RF bandwidth.

17. The system of claim 16, wherein the stack priority data indicates one of the plurality of protocol activities is a first priority, a second priority higher than the first priority, or a third priority higher than the second priority.

18. The system of claim 16, wherein the application priority weighting is based on a first user definition, and wherein the global priority table is based on a second user definition.

19. The system of claim 16, wherein the DMM is further configured to reject the plurality of protocol activities that are not the stack activity.

20. The system of claim 16, wherein the DMM is further configured to:
   search an index of the global priority table using the stack priority data to obtain a value; and
   add the application priority weighting to the value to obtain the final priority.

21. The system of claim 16, wherein the DMM is further configured to determine the final priority for each of the plurality of protocol activities based on the stack priority data, the application priority weighting, a priority from the global priority table, and protocol timing data.

22. The system of claim 21, wherein the application priority weighting includes a time window to assign the application priority weighting.

\* \* \* \* \*